(12) United States Patent
Baccala

(10) Patent No.: US 11,669,350 B1
(45) Date of Patent: Jun. 6, 2023

(54) VIRTUAL DESKTOP MULTIPLEXING SYSTEM FOR VIDEO AND AUDIO CONFERENCING

(71) Applicant: Brent W. Baccala, Chestertown, MD (US)

(72) Inventor: Brent W. Baccala, Chestertown, MD (US)

( * ) Notice: Subject to any disclaimer, the term of this patent is extended or adjusted under 35 U.S.C. 154(b) by 48 days.

(21) Appl. No.: 17/543,982

(22) Filed: Dec. 7, 2021

(51) Int. Cl.
*H04L 65/403* (2022.01)
*G06F 9/451* (2018.01)

(52) U.S. Cl.
CPC ............ *G06F 9/452* (2018.02); *H04L 65/403* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0197132 A1* | 8/2011 | Escoda | ................... | H04L 67/75 715/733 |
| 2011/0264745 A1* | 10/2011 | Ferlitsch | .............. | G06Q 10/109 709/204 |
| 2012/0317485 A1* | 12/2012 | Ding | ................... | H04L 65/1069 715/719 |
| 2013/0198629 A1* | 8/2013 | Tandon | ................. | H04L 65/765 715/716 |

OTHER PUBLICATIONS

Unknown, "BigBlueButton," www.bigbluebutton.org, 2021.
Unknown, "webex," www.webex.com, 2022.
Unknown, "Zoom," www.zoom.us, 2022.

* cited by examiner

*Primary Examiner* — Amal S Zenati
(74) *Attorney, Agent, or Firm* — Grady L. White; Potomac Law Group, PLLC

(57) ABSTRACT

A virtual desktop multiplexing system for video or audio conferencing over a computer network, in which non-privileged viewers receive a conventional remote desktop view of a single virtual desktop running on a multiplexing server, while privileged viewers (moderators) receive a grid view of all virtual desktops running on the multiplexing server for all client computers participating in the video or audio conferencing session.

14 Claims, 16 Drawing Sheets

VIRTUAL DESKTOP MULTIPLEXING SYSTEM FOR VIDEO AND AUDIO CONFERENCING

FIELD OF ART

The present invention relates generally to video and audio conferencing, and more particularly to virtual desktop multiplexing systems for video and audio conferencing that provide group chatting, shared audio, shared desktops and shared desktop applications.

BACKGROUND

In the field of computer networking, remote desktop technology allows a graphical desktop to be displayed to a user in a remote location. The user's mouse movements and keystrokes are transmitted across the network and processed by the computer controlling the graphical desktop. The remote desktop can be identical to what is displayed on the controlling computer's physical monitor (a physical desktop), or can exist solely in the controlling computer's volatile memory and be visible only to remote users (a virtual desktop). Common remote desktop software includes, for example, VNC (Virtual Network Computing) using the open RFB (Remote Frame Buffer) protocol, and Microsoft's Remote Desktop using the proprietary RDP (Remote Desktop Protocol).

Typically, remote desktops can be operated either exclusively, where a single user has total control over the operation of the desktop, or in a shared mode, where multiple users can view one of the participant's desktops simultaneously and their mouse movements and keystrokes are combined. Current technology allows for opening multiple remote desktop sessions and switching back and forth between them sequentially (one at a time). Conventional video conference systems typically provide the following features: (1) a grid of users displaying real-time video, audio and chat and (2) the ability to screen share one user's desktop at a time. While conventional video conference systems construct a grid of users sharing audio, video and chat (as illustrated in FIG. 1), the conventional systems do not provide a grid of virtual desktops simultaneously showing the state of every desktop in a grid in real time. Moreover, no existing video or audio conferencing technology allows users to operate multiple simultaneous remote desktops within an auto-adjusted grid.

There are basically three types of conventional remote desktop sharing, namely "one-to-one" remote desktop sharing, "one-to-many" remote desktop sharing, and "many-to-many" remote desktop sharing. One-to-one remote desktop sharing permits one user to display his/her desktop on the display screen of a remote computer system being used by another user. Using this technology, a single user may also take control of a remote user's desktop. In a one-to-many remote desktop sharing system, one user may have multiple remote desktops active on a single desktop for remote viewing or remote control. The most common video conference implementations involving many-to-many remote desktop sharing typically operate as follows: During a video conference session, one, and only one, participant is allowed to share a specific application (or an entire desktop) with all other users. At any time, this one user can enable and disable sharing of their application or desktop. If another user wants to share one of their applications or their desktop, then that user must repeat the process of enabling and disabling sharing of their desktop, which typically disables the sharing capability of the previous user. Some conventional video conference systems permit sharing of multiple users' desktops simultaneously. However, no conventional system enables simultaneous sharing of desktops side-by-side in a grid. Nor do these video conference systems allow different desktop views to be presented simultaneously to different users.

What these conventional remote desktop sharing methods lack is the ability to present multiple remote desktops in an auto-scaled grid for sharing a single desktop to the group of connected remote desktops.

BRIEF SUMMARY OF INVENTION

Embodiments of the present invention address the above-described limitations and shortcomings of conventional video and audio conferencing systems by providing a virtual desktop multiplexing system. Among other things, embodiments of the present invention display to a moderator a grid containing a real time copy of the contents of every other participant's current virtual desktop. More specifically, a single participant (who is typically a moderator or a class instructor) can simultaneously receive and view in real time an automatically scaled grid, the grid comprising multiple panes showing multiple virtual desktops associated with multiple "non-moderator" participants in the video or audio conference, while the non-moderators receive and view a single virtual desktop, which may (or may not) be the virtual desktop associated with said participant. A moderator may view and interact with any participant's desktop by selecting a pane in the grid. A moderator may also share with any or all of the non-moderator participants a view of any one of the virtual desktops associated with any one of of the participants, which causes a specific virtual desktop within the grid to be presented to all participants in lieu of their own virtual desktops. This is called "screen share", but differs from a conventional screen share in that the moderator is able to select and share any one of the participants' virtual desktops by selecting a pane in the grid, as opposed to each participant in the video conference only being able to share a copy their own desktop.

In preferred embodiments, the grid comprises a multiplicity of panes, typically arranged in a matrix (such as a 2×2 matrix, a 3×2 matrix, or a 4×4 matrix, depending on the number of participants in the conference), wherein each one of the individual panes in the grid shows a copy of the view screen currently showing on the computer desktop screen of one of the participants. Preferably, and as described in more detail below, the system is configured to size and scale the grid automatically in order to provide the best viewing experience for the moderator. In addition, in some embodiments, the system may be configured to provide a "deaf-mode" feature, which allows the moderator to disable the audio sharing function for all but one of the participants so that the moderator can then have a private one-on-one conversation with a specific participant while the moderator is interacting with said participant's desktop. When the private one-on-one conversation is complete, the moderator can re-enable ("un-deaf") the audio sharing function for all participants so that all participants can resume transmitting and receiving audio signals.

There are a wide variety of scenarios in which embodiments of the present invention provide substantial benefits and advantages over conventional video conferencing systems, including (but not limited to) the following example scenarios:

1. A distance learning classroom environment, in which the teacher and all of the students work on individual desktop computers, and the teacher needs or wants to view a grid that simultaneously shows all the computer desktops of all of the students in the class, thereby giving the teacher the ability to monitor the progress of all the students as they work on a computer-based class assignment or class activity;
2. A collaborative software development project, in which multiple software developers would like to view the work and progress of each other in real-time on a specific coding project; and
3. A cybersecurity exercise, in which cybersecurity team members would like to view the on-screen activities of other team members in real-time.

Thus, those with skill in the art will recognize and appreciate, based on this disclosure, that embodiments of the present invention extend and enhance the screen- and desktop-sharing functions of conventional video conferencing technology with auto-scaled grids of virtual desktops, screen sharing to a group of remote desktops. Notably, embodiments of the present invention integrate well with audio-only group conferencing systems, as well as full featured, audio and video conferencing systems.

The current embodiment of the invention is called "collaborate", and is an open source project hosted at https://github.com/BrentBaccala/collaborate.

BRIEF DESCRIPTION OF THE DRAWINGS

The accompanying drawings, which are incorporated into and constitute part of the specification, illustrate preferred embodiments of the invention, and, together with the description, serve to explain the principles of the present invention.

DETAILED DESCRIPTION OF EXEMPLARY EMBODIMENTS

Figure 1:
FIG. 1 shows a screenshot illustrating, by way of example, the typical view shown to all the participants participating in a video conference using a conventional video conferencing system.

Examples of embodiments of the present invention will now be described in some detail. Notably, the exemplary embodiments described below and shown in the drawings are not meant to limit the scope of the present invention or its embodiments or equivalents. In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to unnecessarily obscure aspects of the present invention. Before turning to the figures, a high-level overview of the invention will now be provided.

In the detailed description that follows, the term "remote desktop" refers to a graphical user interface (GUI) operated by a user with a physical monitor and keyboard on a different computer than the computer running the software that creates and manages the GUI. A network protocol is used to communicate screen contents as well as mouse and keyboard actions between the two computers. A "virtual desktop" is a graphical user interface (GUI) without a physical monitor, keyboard, or mouse directly connected to the computer managing it. A virtual desktop is operated by a user manipulating the controls on a remote desktop computer under the control of a remote desktop protocol. A virtual desktop is not a virtual machine, and no virtualization or container technology is required to implement virtual desktops. A "grid" is a matrix comprising multiple panes showing the views of all virtual desktops, the multiple panes being displayed in an auto-scaled row and column format. A "pane" is an individual tile in the grid displaying the state of a user's virtual desktop in real-time. A "name tag" is a label in a pane, which contains the name of the user participant of a virtual desktop displayed in a specific pane within the grid FIG. 1 shows a screenshot illustrating, by way of example, the typical view shown to all the participants participating in a video conference using a conventional video conferencing system, such as Zoom, distributed by Zoom Video Communications of San Jose, Calif., or Teams distributed by Microsoft Corporation of Redmond, Wash. In this case, there are six participants in the video conference. As shown in FIG. 1, what each video conference participant sees on his or her screen is a 3×2 grid showing the faces of all the participants in the video conference.

Figure 2:
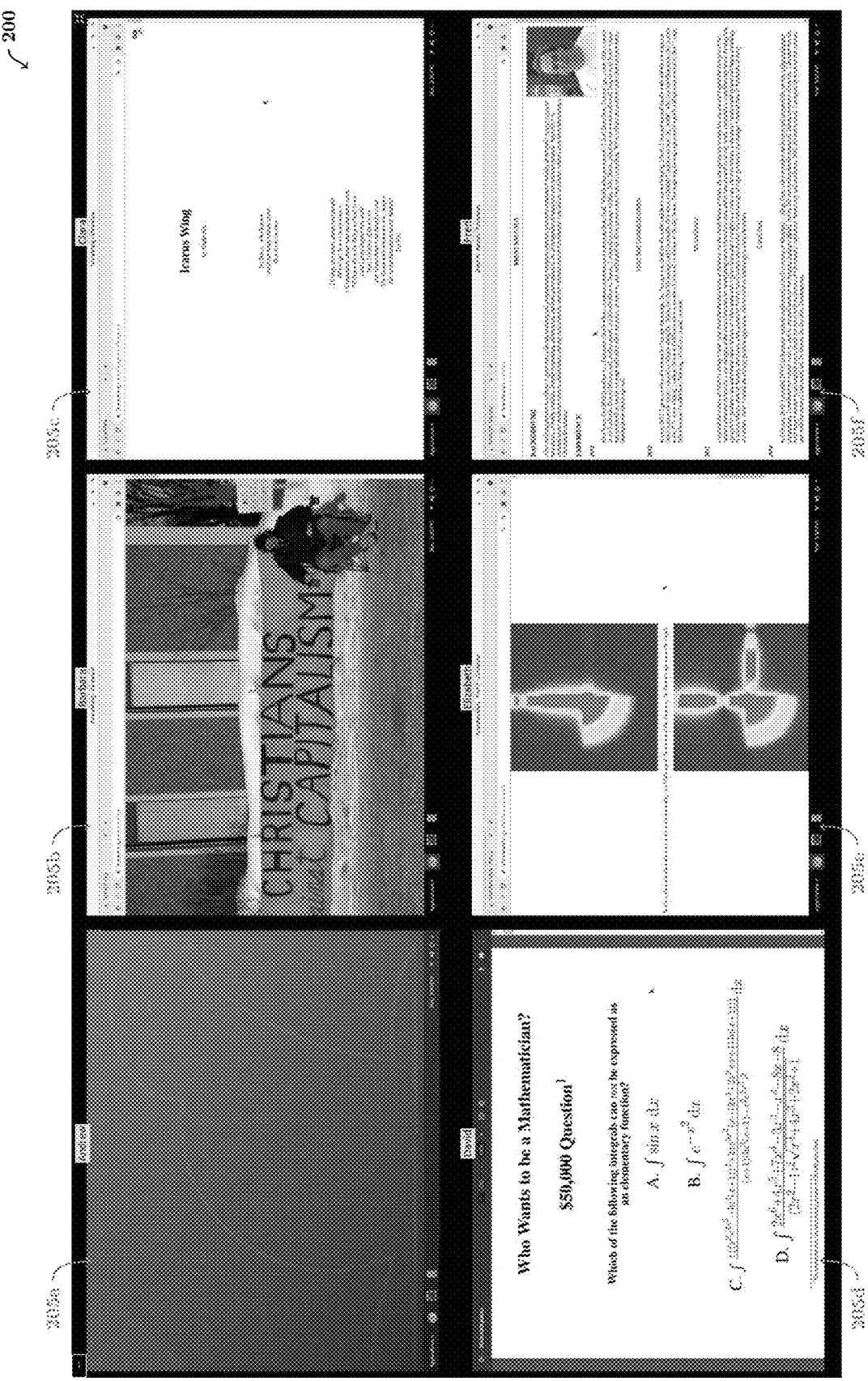
FIG. 2 shows a screenshot illustrating, by way of example, a grid that will be shown to the moderator in embodiments of the present invention during a video conference attended by a total of six participants, including the moderator participant.

FIG. 2 shows a screenshot illustrating, by way of example, a grid 200 that will be shown to the moderator in embodiments of the present invention during a video conference attended by a total of six participants, including the moderator participant. As shown in FIG. 2, the grid 200 comprises six different rectangular panes 205a-205f, which are arranged in a 3×2 matrix. Notably, instead of displaying the faces of the six participants, like the example shown in FIG. 1, the six panes 205a-205f of the present invention shows copies of the visual content (i.e., the "home" virtual desktops) currently being displayed on each one of the computer screens currently being operated by the six participants, respectively. To help the moderator connect the panes 205a-205f showing the six virtual desktops to the six participants, the system helpfully displays a name tag above each one of the six panes 205a-205f. Specifically, as shown in FIG. 2, pane 205a shows a copy of the "home" virtual desktop of participant "Andrew," pane 205b shows a copy of the "home" virtual desktop of participant "Barbara," pane 205c shows a copy of the "home" virtual desktop of participant "Clara," pane 205d shows a copy of the "home" virtual desktop of participant "David," pane 205e shows a copy of the "home" virtual desktop of participant "Elizabeth," and pane 205f shows a copy of the "home" virtual desktop of participant "Fred."

In this example, it can be seen that all of the participants may be running different applications. It will be understood and appreciated, however, that all of the participants could also be using the same application without departing the scope of the claimed invention. Regardless of whether all the participants are using the same or different applications, the moderator can simultaneously observe the progress of each participant. The moderator may also select any one of the six panes 205a-205f to interact exclusively with the virtual desktop shown in that particular pane. The moderator may also select any one of the six panes 205a-205f to cause the visual and audio content shown or played in that particular pane to be transmitted to the computers of all the participants in the video conference.

Figure 3:
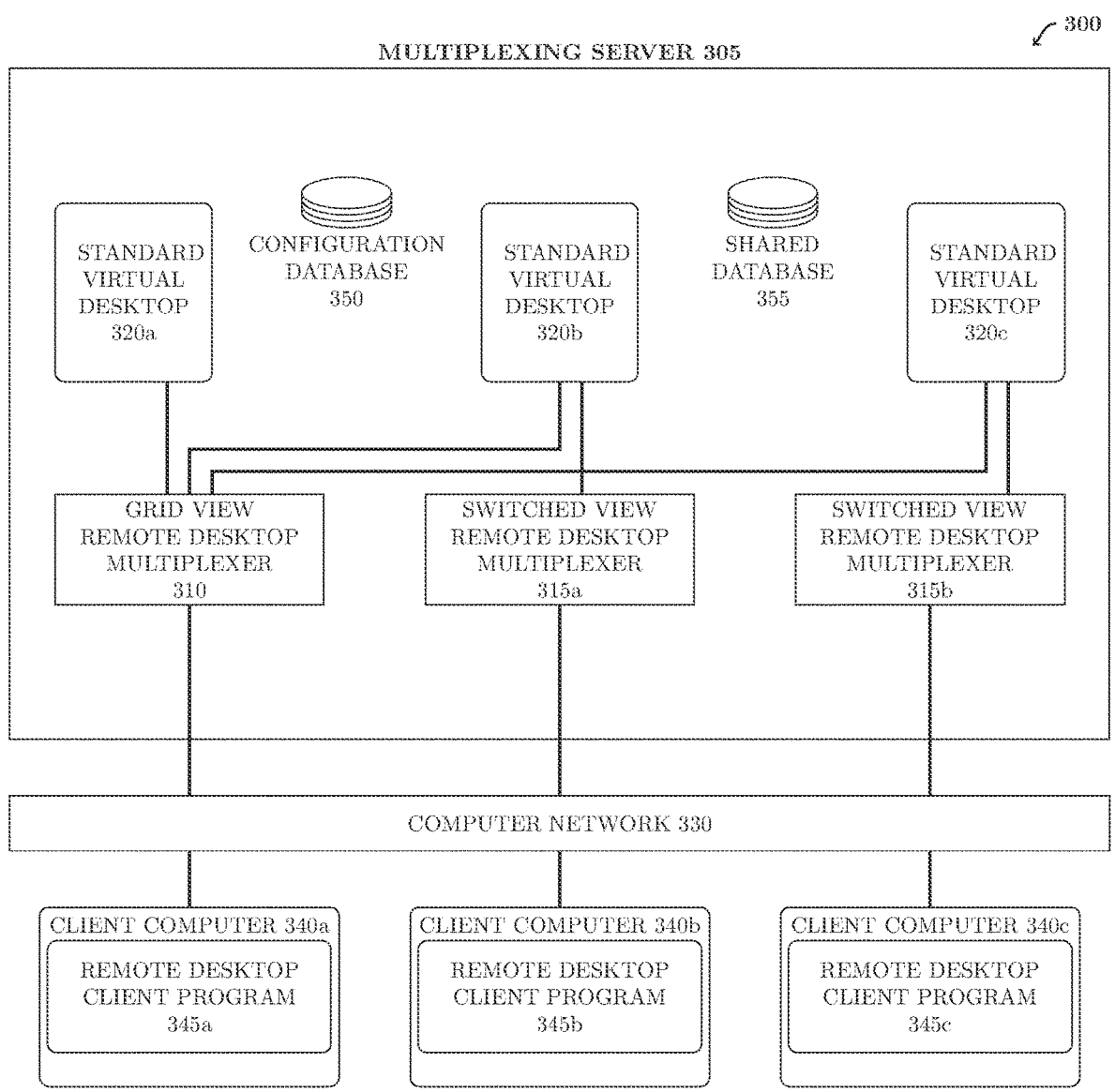
FIG. 3 shows a high-level block diagram illustrating, by way of example, the primary physical and logical components of one embodiment of the present invention.

FIG. 3 contains a high-level block diagram 300 showing the primary physical and logical components of one embodiment of the present invention. As shown in FIG. 3, a multiplexing server 305 is connected via a computer network 330 to one or more client computers (340a-c). Clients communicate with the multiplexing server using a standard remote desktop protocol, VNC, in the current embodiment. The multiplexing server uses standard virtual desktops (320a-c), which run conventional GUI desktops, the GNOME 3 desktop in current embodiment, and permit the use of standard GUI programs such as web browsers, terminal windows, or others. The virtual desktop server is a program running on the multiplexing server, with no associated physical display, on which graphical programs can be run, and whose virtual graphical display may be viewed using a remote desktop protocol. Each user has their own standard "home" virtual desktop, though client computers (340a-c) do not connect directly to these virtual desktops.

When a client computer (340a-c) runs a remote desktop client program (345a-c) that connects to the server, a new remote desktop multiplexer is created, either a grid view remote desktop multiplexer 310 or a switched view remote desktop multiplexer 315a-b. A grid view remote desktop multiplexer is created for privileged viewers, while a switched view remote desktop multiplexer is created for non-privileged viewers. A switched view remote desktop multiplexer presents one of the standard virtual desktops, usually that user's "home" virtual desktop, but it can be switched to display other virtual desktops. In addition to their grid view, grid view remote desktop multiplexers may also screen share any of the virtual desktops, which causes that virtual desktop to be presented to all viewers with a switched view remote desktop multiplexer in lieu of their own "home" virtual desktop. Again, this differs from a conventional screen share in that the moderator is sharing a virtual desktop selected from the grid, as opposed to sharing their own local desktop. A configuration database 350 contains settings specified by the system administrator, including but not limited to such information as which users are permitted access, how they authenticate, and which kind of virtual desktop multiplexer they receive. A shared database 355 is maintained by the system in volatile memory and contains information such as, but not limited to, which users are currently connected, whether a screen share is active, and if so, which virtual desktop is being screen shared.

In the current embodiment of the invention, standard virtual desktops 320a-c are X Windows desktops created using an unmodified copy of version 1.10 of the open-source program Xtigervnc.

Both switched and grid view remote desktop multiplexers are constructed by introducing, for each user, an additional, specialized, virtual desktop on which views of other virtual desktops are displayed. It is this additional virtual desktop that is actually presented to the user. By controlling which other virtual desktops are placed on this virtual desktop, the multiplexing feature is achieved.

The switched view remote desktop multiplexer is constructed to allow one of several virtual desktops to be displayed to a remote desktop client, and allows the view to be switched among those several virtual desktops under software control.

Figure 4:
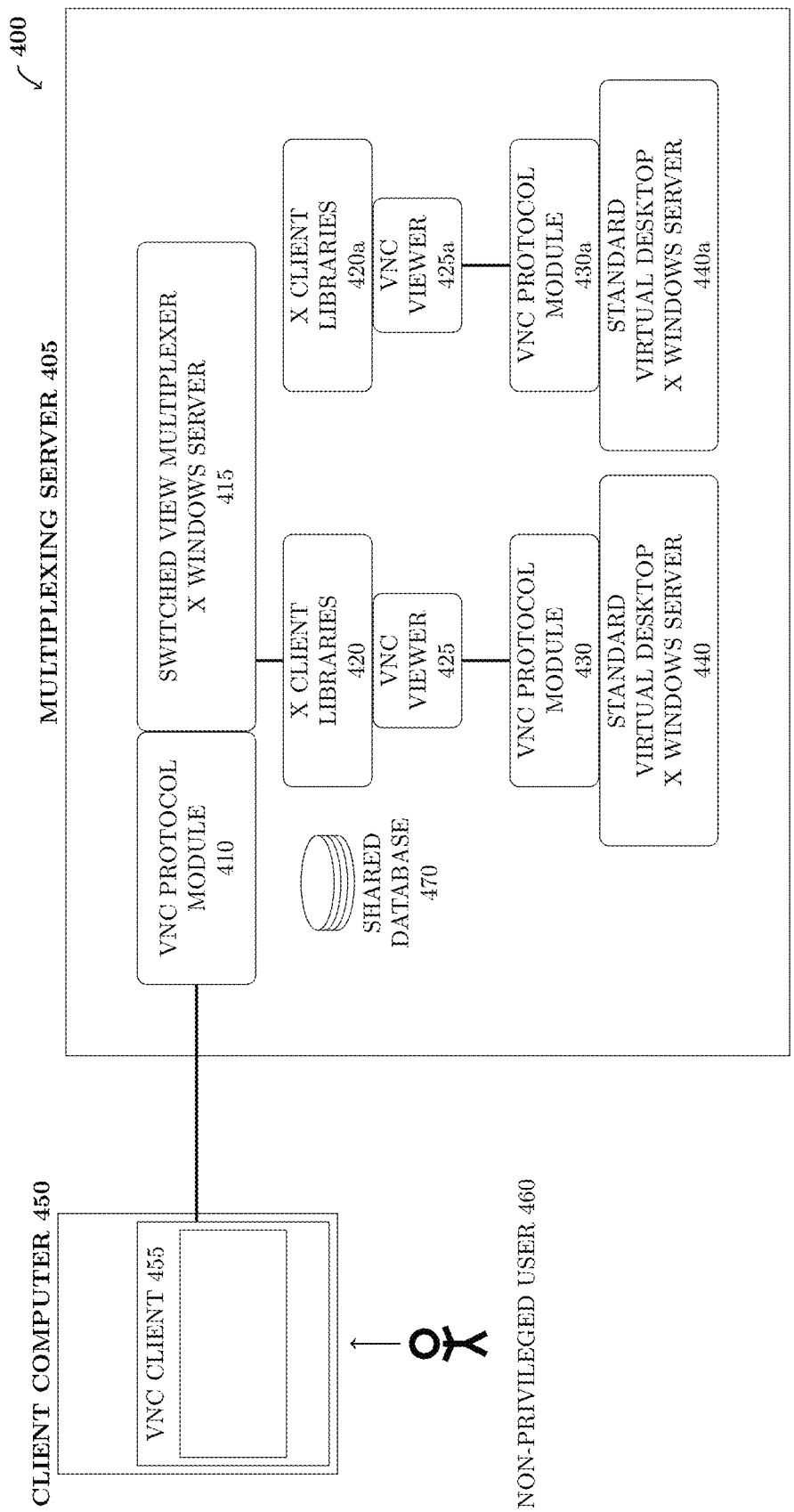
FIG. 4 contains a high-level block diagram that illustrates, by way of example, how the switched view remote desktop multiplexer may be structured and configured to work in certain embodiments of the present invention.

FIG. 4 contains a high-level block diagram 400 that illustrates, by way of example, how a switched view remote desktop multiplexer may be structured and configured to work in certain embodiments of the present invention. When a client computer 450 connects to the multiplexing server 405 and a switch view multiplexer is to be used, a new virtual desktop 415 is started and projected to client 455. A single remote desktop viewer program 425 runs on the virtual desktop server 415 and relays a view of a standard virtual desktop 440. If viewer 425 is configured to relay keyboard and mouse events from client 455 to virtual desktop 440, then user 460 will view and operate virtual desktop 440 as if it were directly connected to VNC client 455. The view can be switched to a different standard virtual desktop 440a by terminating viewer program 425 and replacing it with viewer program 425a. Like viewer 425, viewer 425a can be configured to either forward or block keyboard and mouse events, presenting to user 460 either a fully interactive or a view-only session on standard virtual desktop 440a. The switched multiplexing feature is achieved by terminating viewer 425 and starting another similar viewer 425a in its place, connected to a different standard virtual desktop. This switching process can be repeated indefinitely. The current standard virtual desktop 440 is selected, along with an indication if viewer 425 should be fully interactive or view-only, by inspecting screen share notifications in shared database 470.

In the current embodiment of the invention, the virtual desktop 415 is an X Windows desktop created using an unmodified copy of version 1.10 of the open-source program Xtigervnc. The remote desktop viewing programs 425 and 425a are copies of version 1.0.29 of the open-source program ssvncviewer, which has been modified to disable its keyboard escape sequence so that it appears completely transparent to keyboard and mouse events when used as a multiplexer in this invention. ssvncviewer is also equipped with command line options that set its screen location and scaling ratio, and allow non-interactive, view-only sessions. Those with skill in the art could construct a switched view remote desktop multiplexer in many methods, of which this is one.

Figure 5:
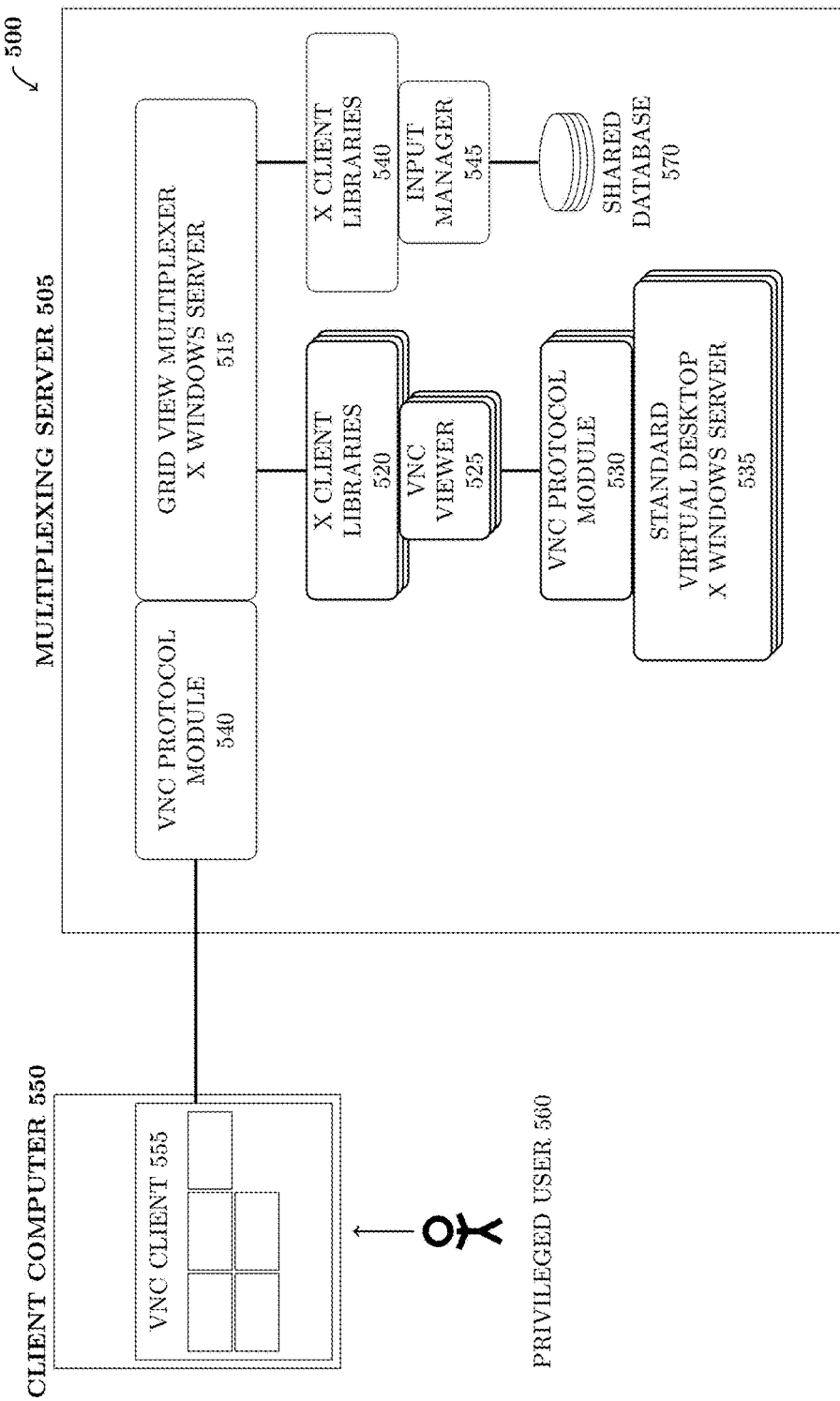
FIG. 5 contains another high-level block diagram illustrating, by way of example, how the grid view remote desktop multiplexer may be structured and configured to work in certain embodiments.

FIG. 5 contains a high-level block diagram 500 that illustrates, by way of example, how a grid view remote desktop multiplexer may be structured and configured to work in certain embodiments of the present invention. The grid view remote desktop multiplexer works similarly to the switched view remote desktop multiplexer, but can present a simultaneous view of multiple remote desktops instead of just one. When a client computer 550 connects to the multiplexing server 505 and a grid view is to be presented, a new virtual desktop server 515 is started and projected to client 555. Remote desktop viewer programs 520 run on the virtual desktop server 515 and present views of standard virtual desktops 535, laid out in a grid view. Another program, input manager 545, runs on virtual desktop server 515 and is responsible for handling user interaction from user 560 when in grid mode. User 560 can select one of the panes in the grid for full interaction, in which case another viewer program 520 is started to present the corresponding remote desktop full screen and fully interactive, hiding the panes in the grid behind it, so the effect is similar to the operation in switched mode, presenting a single virtual desktop for transparent operation. Also, user 560 can select one of the panes in the grid to screen share, and a notification to that effect is placed in shared database 570.

In the current embodiment of the invention, the virtual desktop 515 and the remote desktop viewer 525 are implemented using the same components as virtual desktop 415 and remote desktop viewer 425, specifically, an unmodified copy of version 1.10 of Xtigervnc, and the same copy of version 1.0.29 of ssvncviewer, modified in the same way as described before. Input manager 545 is implemented using the open source window manager FVWM, version 2.6.7, unmodified.

Since the software components illustrated in FIG. 5 are a superset of the software components in FIG. 4, it should be clear that in another possible embodiment a single remote desktop multiplexer could be constructed that could perform the functions of both switched view and grid view remote desktop multiplexers, and an illustration of such a multiplexer would appear just as FIG. 5. Specifically, remote desktop viewer programs 525 can be started and configured to provide full-screen access, either fully interactive or view-only, to any desired virtual desktop, under software control. Likewise, a grid view could also be presented, again under software control, containing all or some of the multiplexing server's virtual desktops, and an input manager 545 can be started to manage user input in grid mode. Selecting between the two display modes, full-screen or grid, can also be performed under software control, typically in response to user input provided to input manager 545, or changes in shared database 570.

Figure 6:
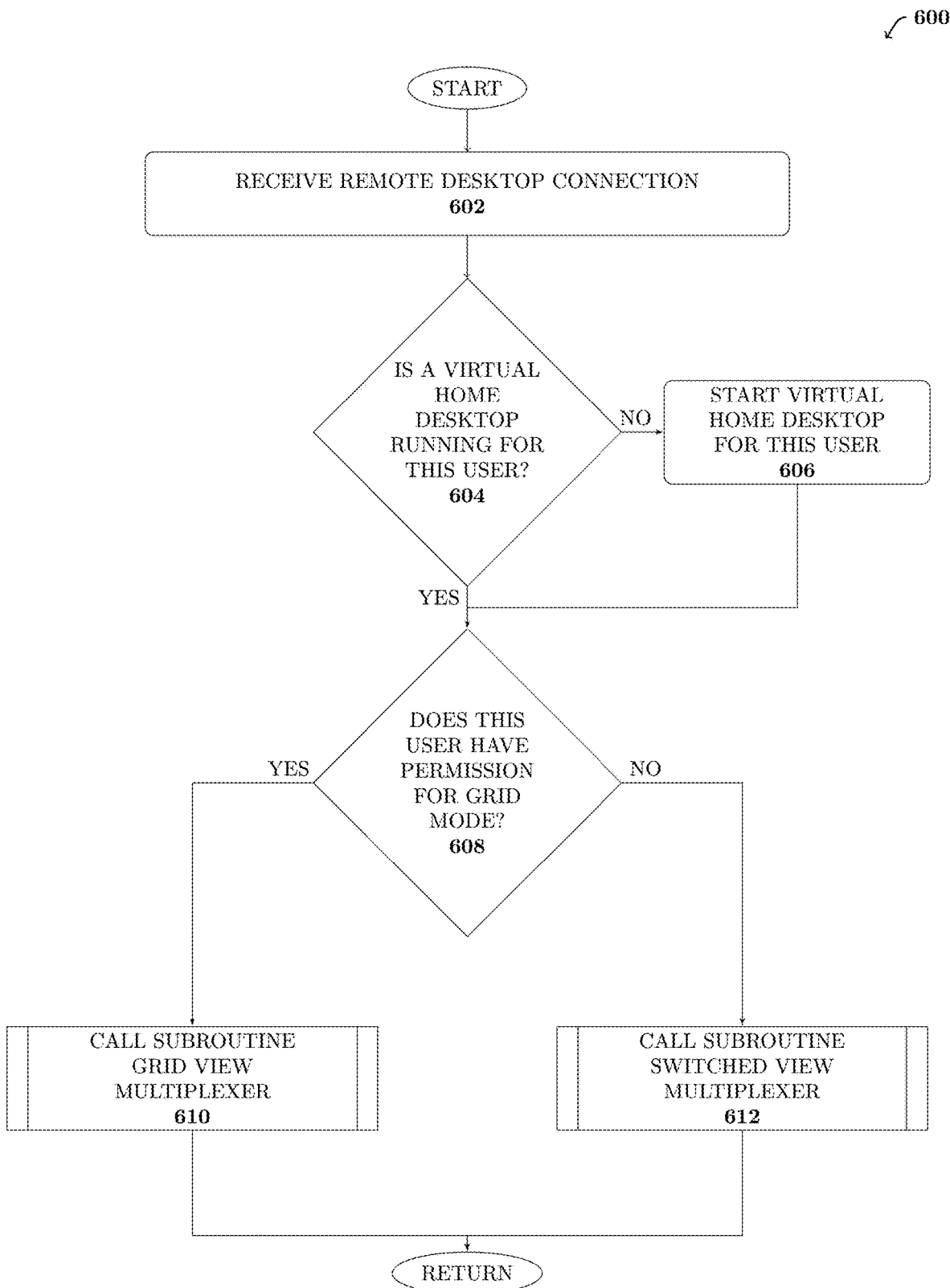
FIG. 6 contains a high-level flow diagram illustrating, by way of example, an algorithm the system may be configured to execute in order to process each new remote desktop connection from a client computer.

FIG. 6 contains a high-level flow diagram 600, illustrating, by way of example, an algorithm the system may be configured to execute in order to process each new remote desktop connection from a client computer, such as 450 or 550. At step 602, the system receives a remote desktop connection from a client. Since each user has their own standard "home" virtual desktop, a check is made on step 604 to see if this virtual desktop and its associated software is running. If not, it is started on step 606. The ability to view and operate multiple virtual desktops is a privileged function, so step 608 checks if the user has adequate privilege and calls the "grid view multiplexer" subroutine in step 610 if so. If not, the "switched view multiplexer" subroutine is called at step 612.

Figure 7:
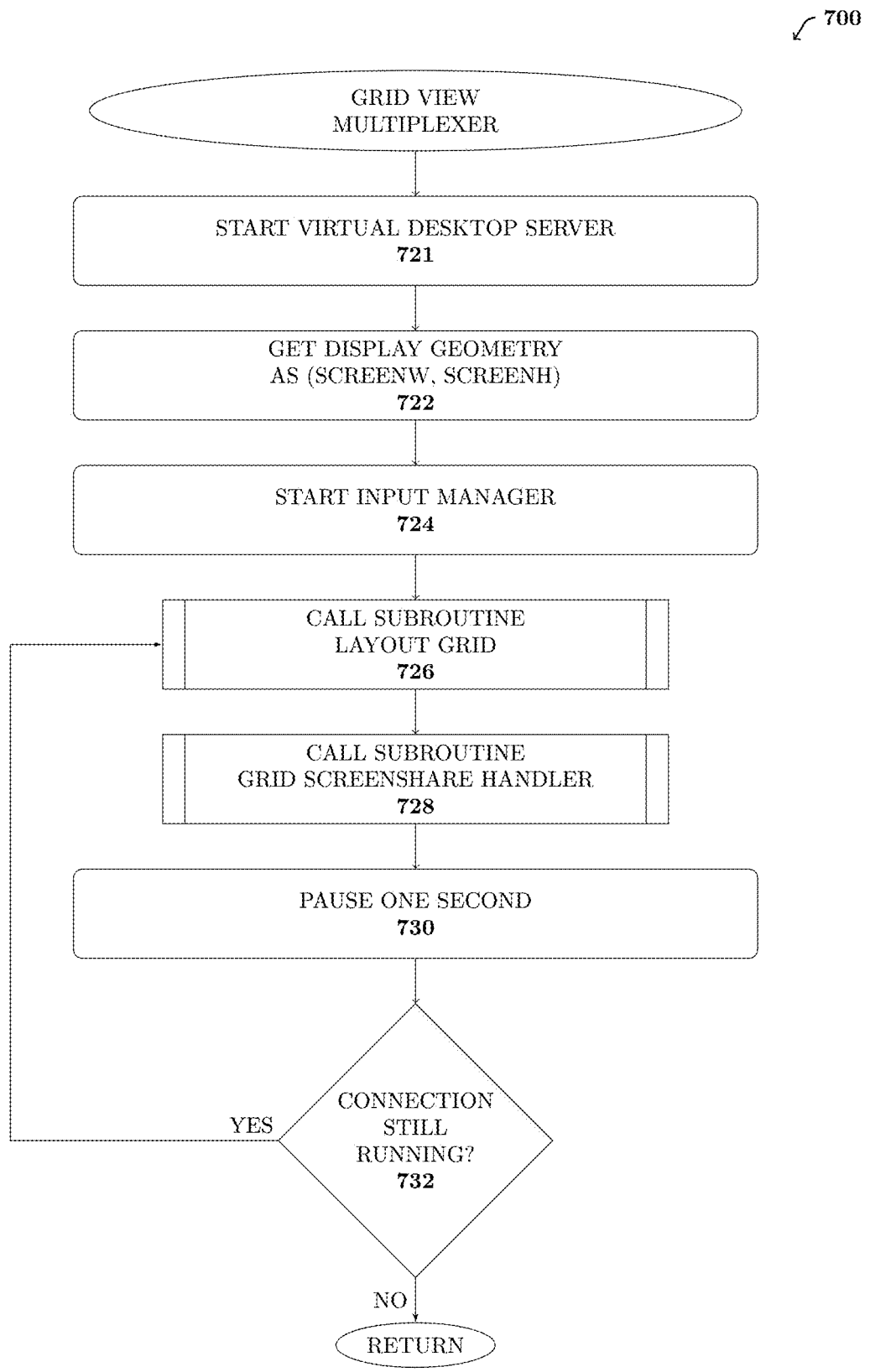
FIG. 7 contains a high-level flow diagram illustrating, by way of example, a "grid view multiplexer" algorithm the system may be configured to execute in order to implement a grid view remote desktop multiplexer.

FIG. 7 contains a high-level flow diagram 700, illustrating, by way of example, a "grid view multiplexer" algorithm the system may be configured to execute in order to produce the grid view remote desktop multiplexer, and called as a subroutine from step 610. It is understood that this algorithm may be performed in a main program for the system, in a subroutine for the system, or both. Step 721 starts virtual display 515 that will be used to present the grid. In step 722, the system obtains the display geometry, in pixels, of the virtual display 515. This display geometry defaults to a common value, 1280×720 in the current embodiment, but this can be adjusted using a menu option provided by the input manager 545. In step 724, an input manager 545 is started to manage user input. Starting at step 726, a processing loop begins that will run continuously until this session terminates. Step 726 calls the "layout grid" subroutine that manages the grid display, and step 728 calls the "grid screenshare handler" that manages screen sharing.

Figure 8:
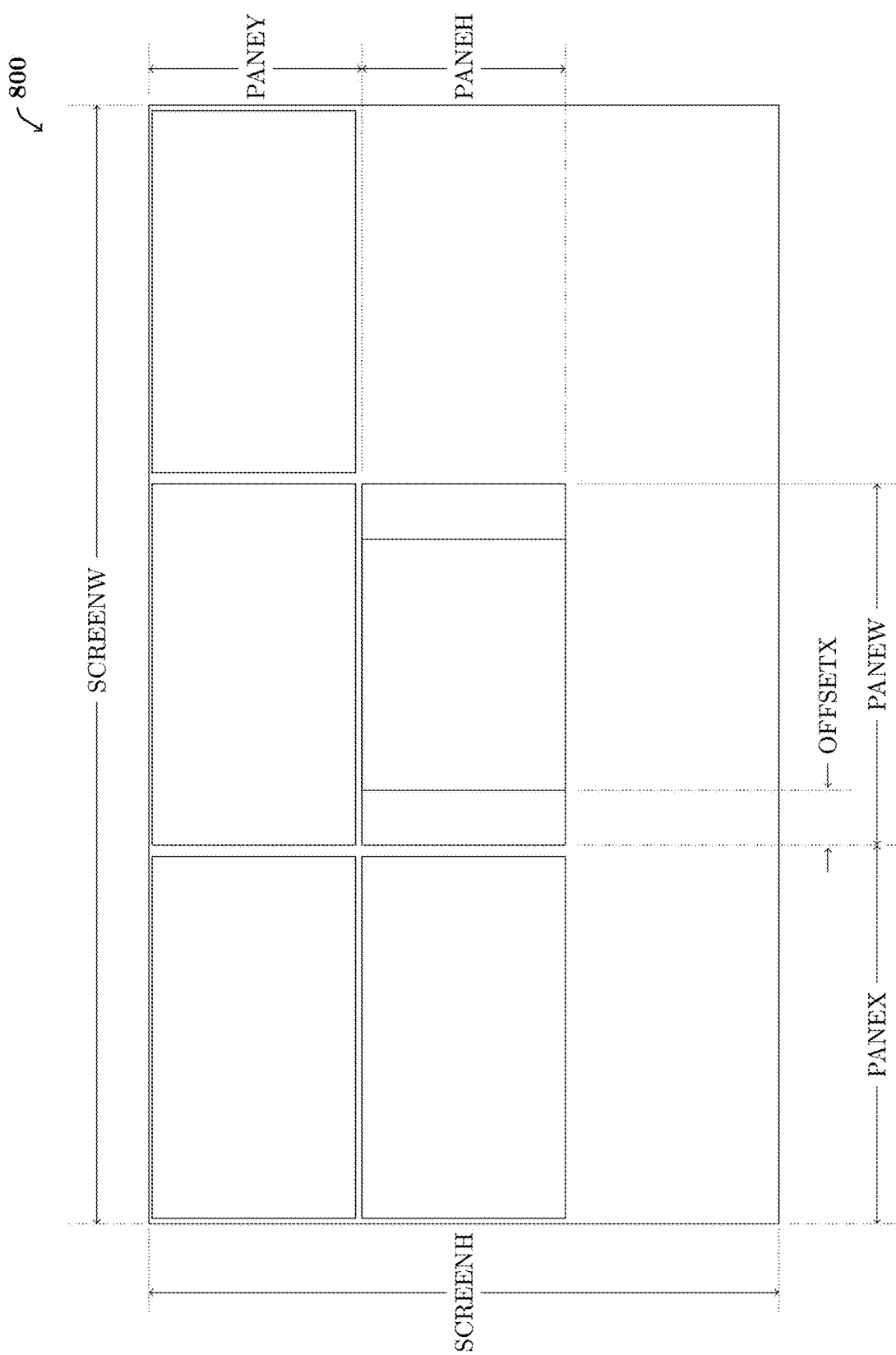
FIG. 8 shows a schematic diagram illustrating, by way of example, the various dimensions used in computing the layout of a grid.

FIG. 8 shows a schematic diagram illustrating by way of example, the various dimensions used in computing the layout of a grid 800. The screen dimensions obtained in step 722 are SCREENW and SCREENH. The width and height of each pane in the grid is PANEW and PANEH, respectively. The coordinates of the upper left corner of a pane are PANEX and PANEY; for the sake of illustration the coordinates associated with the center pane are shown in the diagram. The horizontal distance from the left edge of a pane to the left edge of the virtual desktop display presented within it is OFFSETX, which is only non-zero if the aspect ratio of the virtual display is less than the aspect ratio of the pane. Not shown is OFFSETY, the vertical distance from the top edge of a pane to the top edge of the virtual desktop display presented within it, which is only non-zero if the aspect ratio of the virtual display is greater than the aspect ratio of the pane. Only one of OFFSETX or OFFSETY can be non-zero, and both will be zero if the aspect ratio of the virtual desktop displayed in a pane matches the aspect ratio of the pane.

Figure 9:
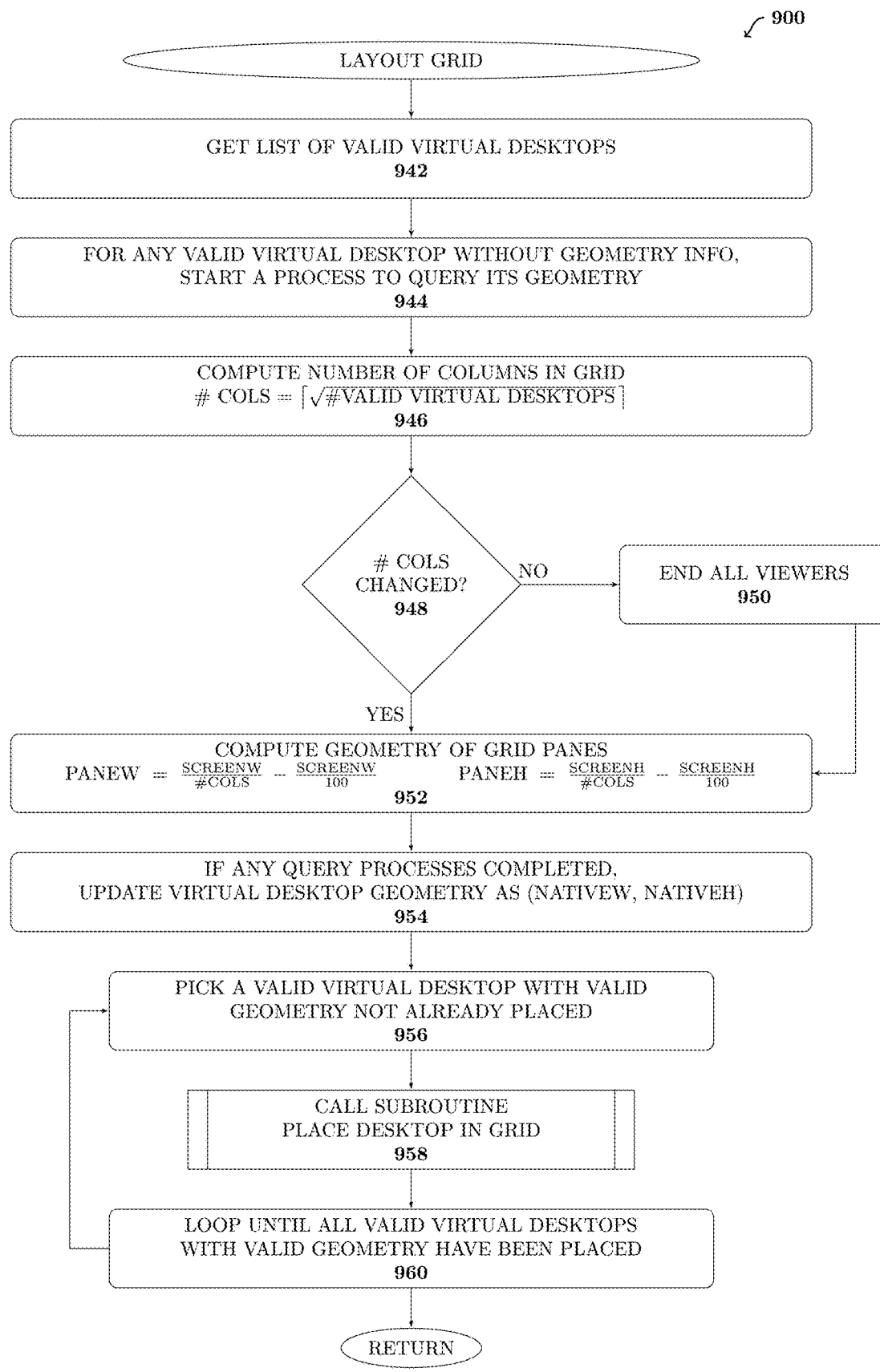
FIG. 9 contains a high-level flow diagram illustrating, by way of example, an algorithm the system may be configured to execute in order to produce the layout for the grid.

FIG. 9 contains a high-level flow diagram 900, illustrating, by way of example, an algorithm the system may be configured to execute in order to produce a layout for the grid. Thus, the algorithm 900 describes the steps of an exemplary "layout grid" subroutine. First, step 942 obtains a list of the virtual desktops that are to be presented in the grid. These are called the "valid" virtual displays. In the present embodiment, the valid virtual displays are either all standard virtual desktops running on the system, or all standard virtual desktops running for the current users in the current meeting. If the geometry of any such virtual desktop is unknown for some reason, step 944 starts a process to query it and obtain that information. Step 946 computes the number of columns in the grid, which is the square root of the number of valid virtual desktops, rounded up to the nearest integer. In step 948 the system asks if that number has changed, and if so, in step 950, end all running viewer processes that were previously started in step 1090. In step 952, the system computes PANEW and PANEH, the width and height of each grid pane, by dividing the width (resp. height) of the virtual grid display 515 by the number of columns in the grid, and then subtracting an additional one percent of the width (resp. height) to introduce spacing between the grid panes. In the illustrated embodiment, using a square grid, the number of columns and the number of rows are the same. A preferred embodiment would allow more flexible grid layout, such as using a 4×2 rectangular grid to arrange 5:4 aspect ratio panes on a 16:9 aspect ratio display. In step 954, the system checks to see if any of the processes that the system started in step 944 have completed, and, if so, the system records the virtual desktop width and height as NATIVEW and NATIVEH. In steps 956-960, the system repeatedly picks virtual desktops that have valid geometry information from steps 944 and 954 and haven't yet been placed in the grid (or were removed in step 950), and call subroutine "place desktop in grid" for each one.

Figure 10:
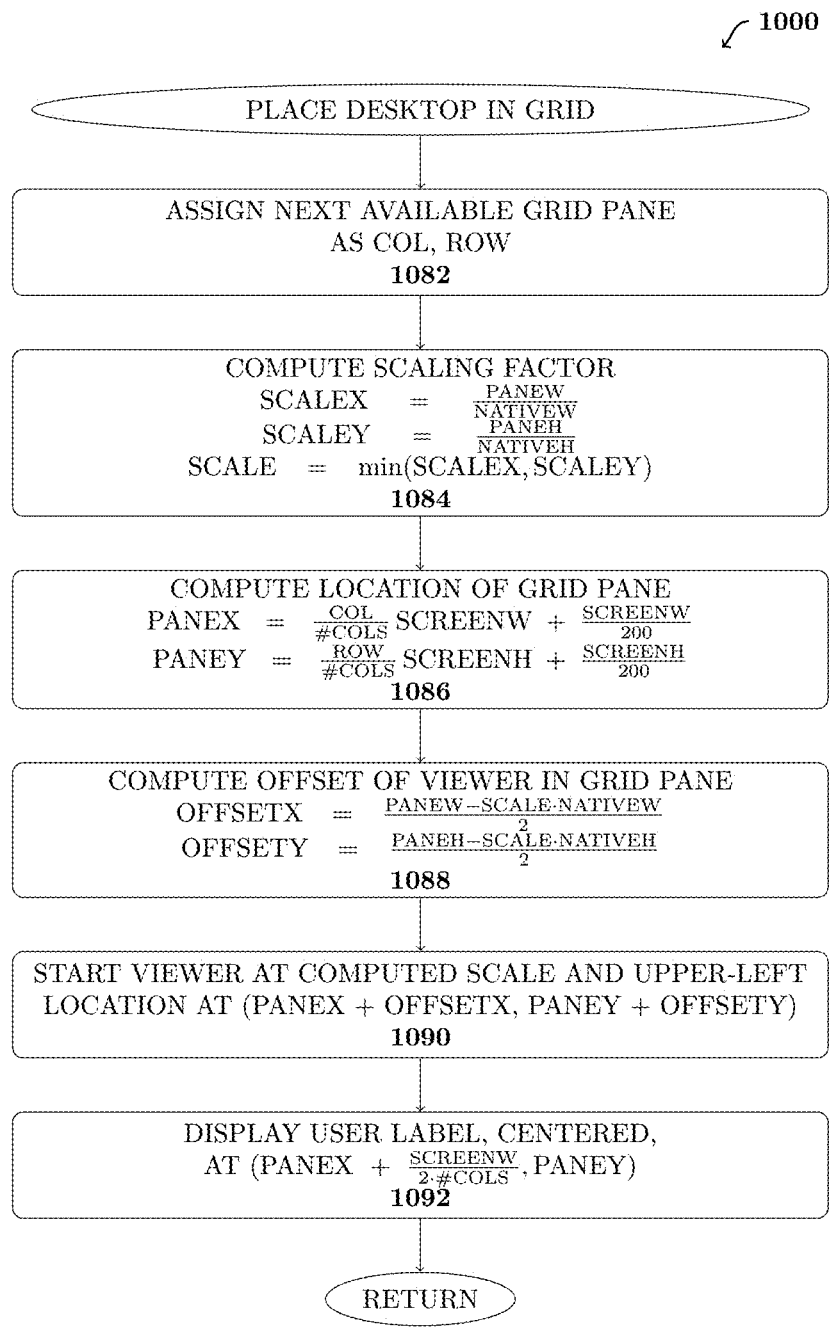
FIG. 10 contains a high-level flow diagram illustrating, by way of example, an algorithm the system may be configured to execute in order to place a particular virtual desktop in the grid.

FIG. 10 contains a high-level flow diagram 1000, illustrating, by way of example, an algorithm the system may be configured to execute in order to place a particular virtual desktop in the grid, and called as a subroutine in step 958. First, the system assigns the next available grid pane as shown in step 1082. In step 1084, the system computes the scaling factor required to fit the virtual desktop in the pane by dividing PANEW (resp. PANEH), the width (resp. height) of the pane, by NATIVEW (resp. NATIVEH), the width (resp. height) of the virtual desktop, and selecting the smaller of these two scale values. Step 1086 computes PANEX and PANEY, the coordinates of the grid pane, and step 1088 computes OFFSETX (resp. OFFSETY), the horizontal (resp. vertical) offset of the virtual desktop in the pane. Step 1090 starts a viewer of the virtual desktop using the computed scale and geometry values. In step 1092, a label is displayed at the top of the grid pane identifying the virtual desktop that appears in that pane.

Figure 11:
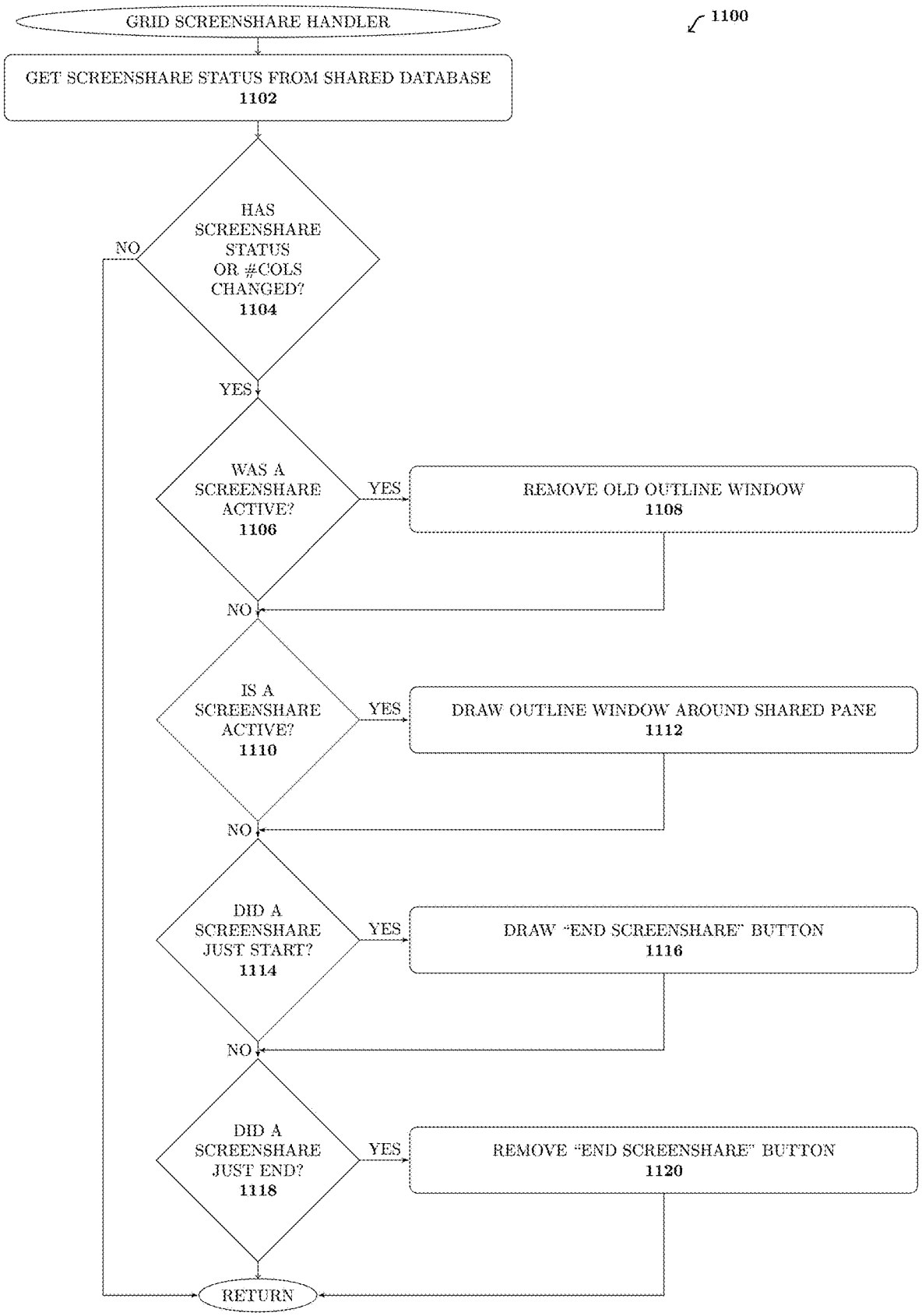
FIG. 11 contains a high-level flow diagram illustrating, by way of example, an algorithm that may be executed by a "grid screenshare handler" subroutine in embodiments of the present invention to provide the moderator with a visual indication on the grid if a screen share is active.

FIG. 11 contains a high-level flow diagram 1100, illustrating, by way of example, an algorithm that may be executed by a "grid screenshare handler" subroutine in the system in order to provide a moderator with a visual indication on the grid if a screen share is active, and called as a subroutine from step 728. The indication typically comprises a colored outline window around the screen shared desktop, along with a button that can be used to terminate the screen share. In step 1102, a query is sent to a shared database to see if a screen share notification has been placed there. Step 1104 decides if any change is needed to the screen share indication. If not, processing returns to the calling subroutine. In steps 1106 and 1108, the system removes any old outline window. In steps 1110 and 1112, the system draws a new outline window around the currently shared virtual desktop. In steps 1114 and 1116, the system adds an "end screenshare" button to the display if a screen share has just started, and in steps 1118 and 1120, the system removes that button if the screen share just ended.

Figure 12:
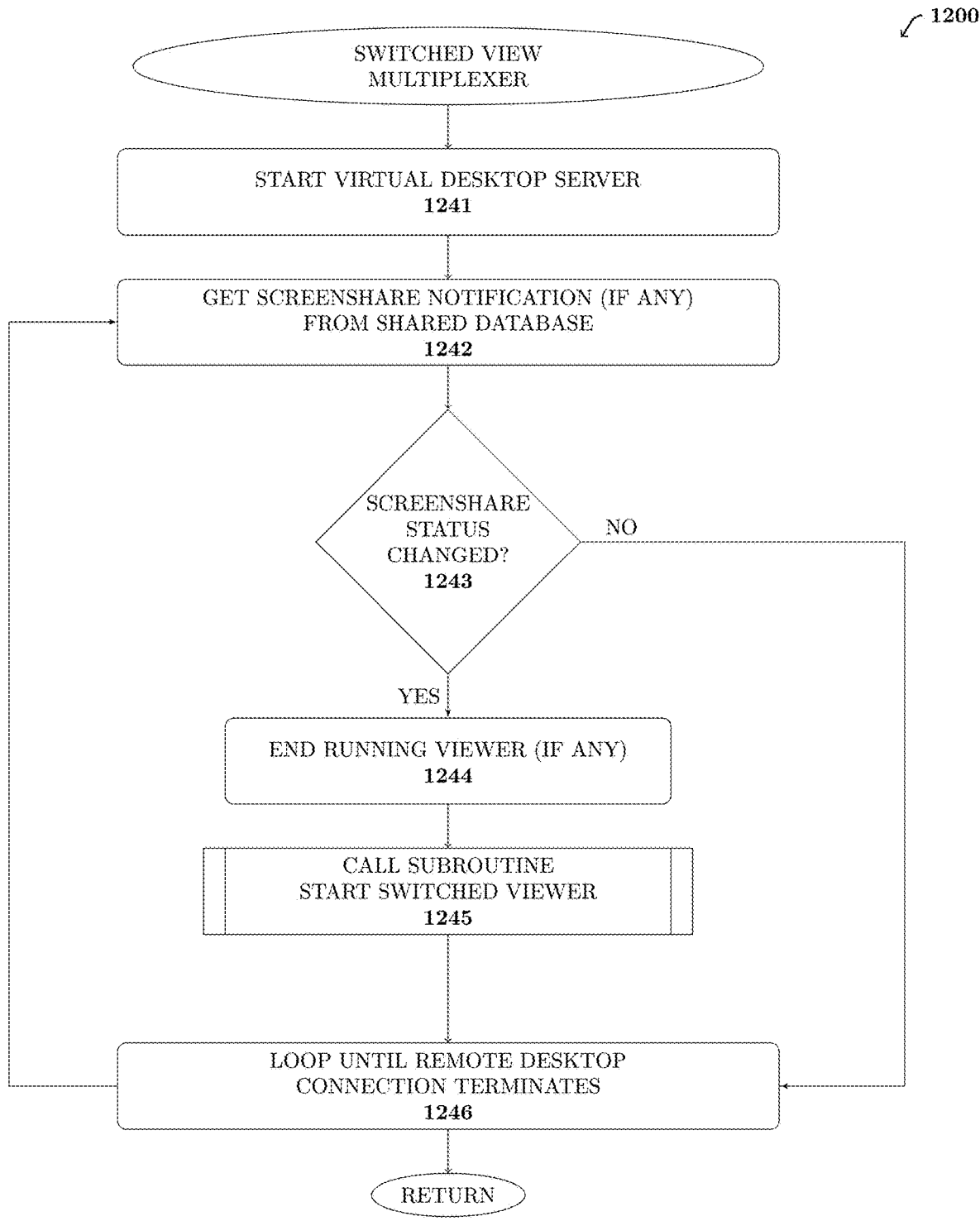
FIG. 12 contains a high-level flow diagram illustrating, by way of example, an algorithm the system may be configured to execute in order to implement a switched view remote desktop multiplexer.

FIG. 12 contains a high-level flow diagram 1200, illustrating, by way of example, an "switched view multiplexer" algorithm the system may be configured to execute in order to handle a switched view remote desktop multiplexer, which is a display for a user, typically a student, who does not receive the grid view, and is called as a subroutine from step 612. Step 1241 starts a server for virtual display 415. The loop starting on step 1242 retrieves a screen share notification from the shared database, then checks to see if it has changed in step 1243. If it has, then step 1244 ends the viewer that was started by the "start switched viewer" subroutine and step 1245 calls that subroutine again. The system then loops (step 1246) until the remote desktop connection terminates.

Figure 13:
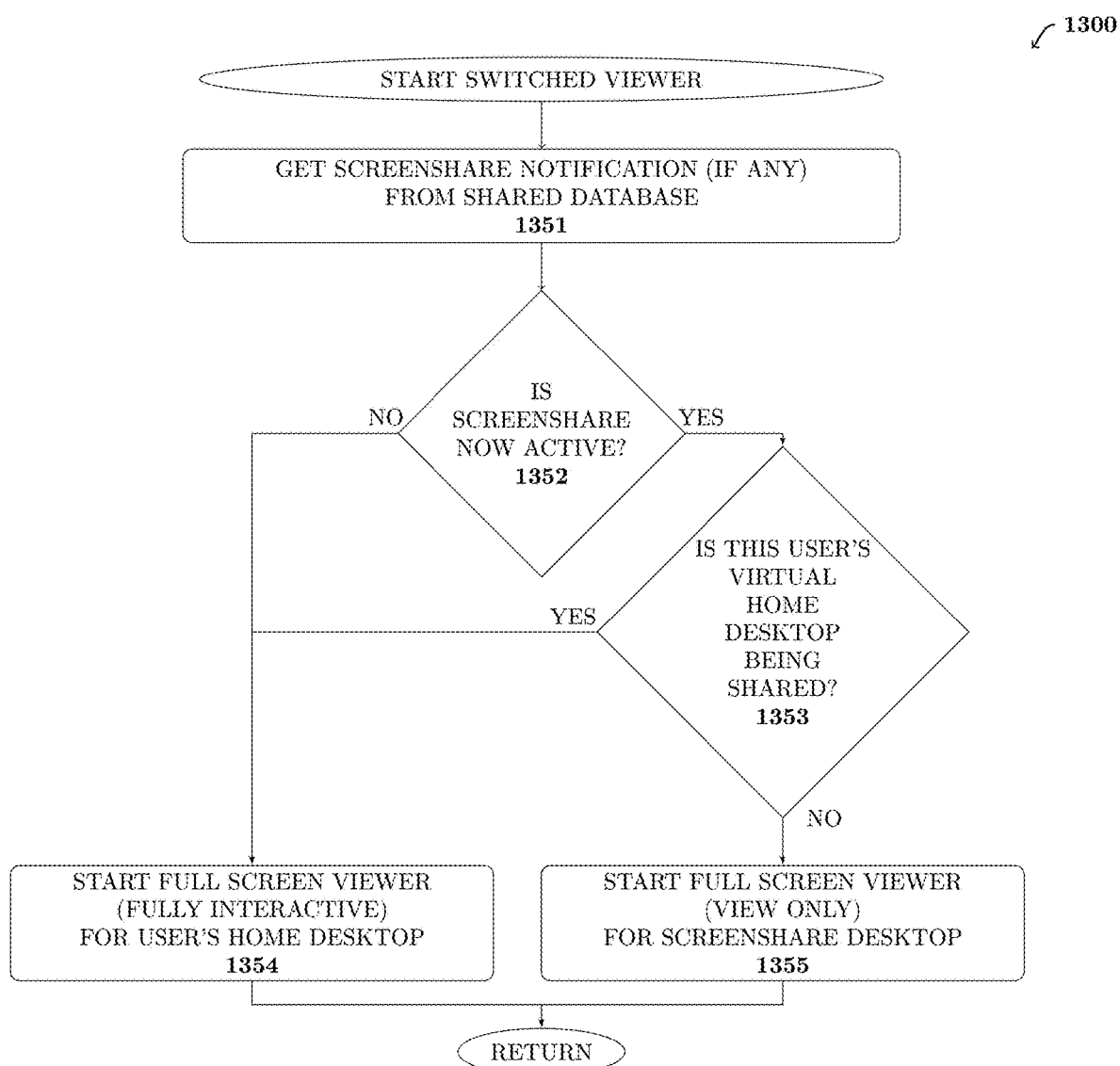
FIG. 13 contains a flow diagram illustrating, by way of example, the steps in a subroutine that may be executed by the system in order to start the switched viewer.

FIG. 13 contains a flow diagram 1300 illustrating, by way of example, the steps in a subroutine configured to start the switched viewer, called as a subroutine from step 1245. The screen share notification is retrieved in step 1351. If a screen share is active (step 1352) and the virtual desktop being shared does not belong to the current user (step 1353), then a viewer is started on step 1355 that displays the screen shared virtual desktop but does not allow interaction with it. Otherwise, if there is either no screen share active, or if the virtual desktop being shared is the current user's "home" virtual desktop, then a fully interactive viewer is started on step 1354.

Figure 14:
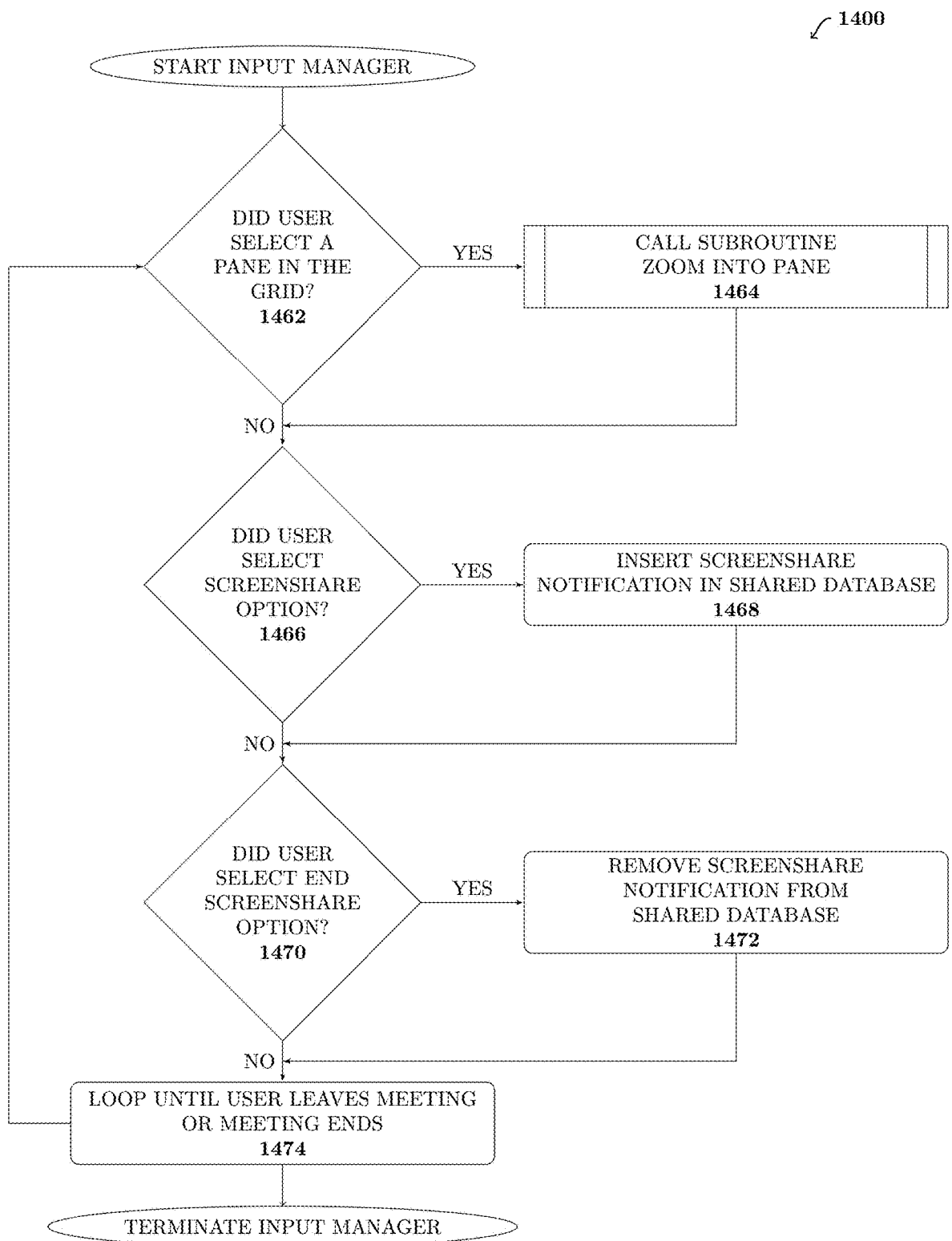
FIG. 14 contains a high-level flow diagram, illustrating, by way of example, the steps that the input manager uses to handle mouse input in grid mode.

FIG. 14 contains a high-level flow diagram 1400, illustrating, by way of example, the steps that the input manager 545 started in step 724 handles mouse input in grid mode. If the user selected a pane in the grid, typically by clicking on it (step 1462), then subroutine "zoom into pane" is called in step 1464. If the user instructed the system to screen share a virtual desktop (step 1466), typically by selecting "screenshare" from a menu, then step 1468 inserts a screen share notification into the shared database, which will be detected in steps 1102 and 1242. If the user instructs the system to end a screen share, typically by clicking on an "end screenshare" button, the screen share notification is removed from the shared database, which is again detected in steps 1102 and 1242. The input manager loops (1474) until the connection terminates.

Figure 15:
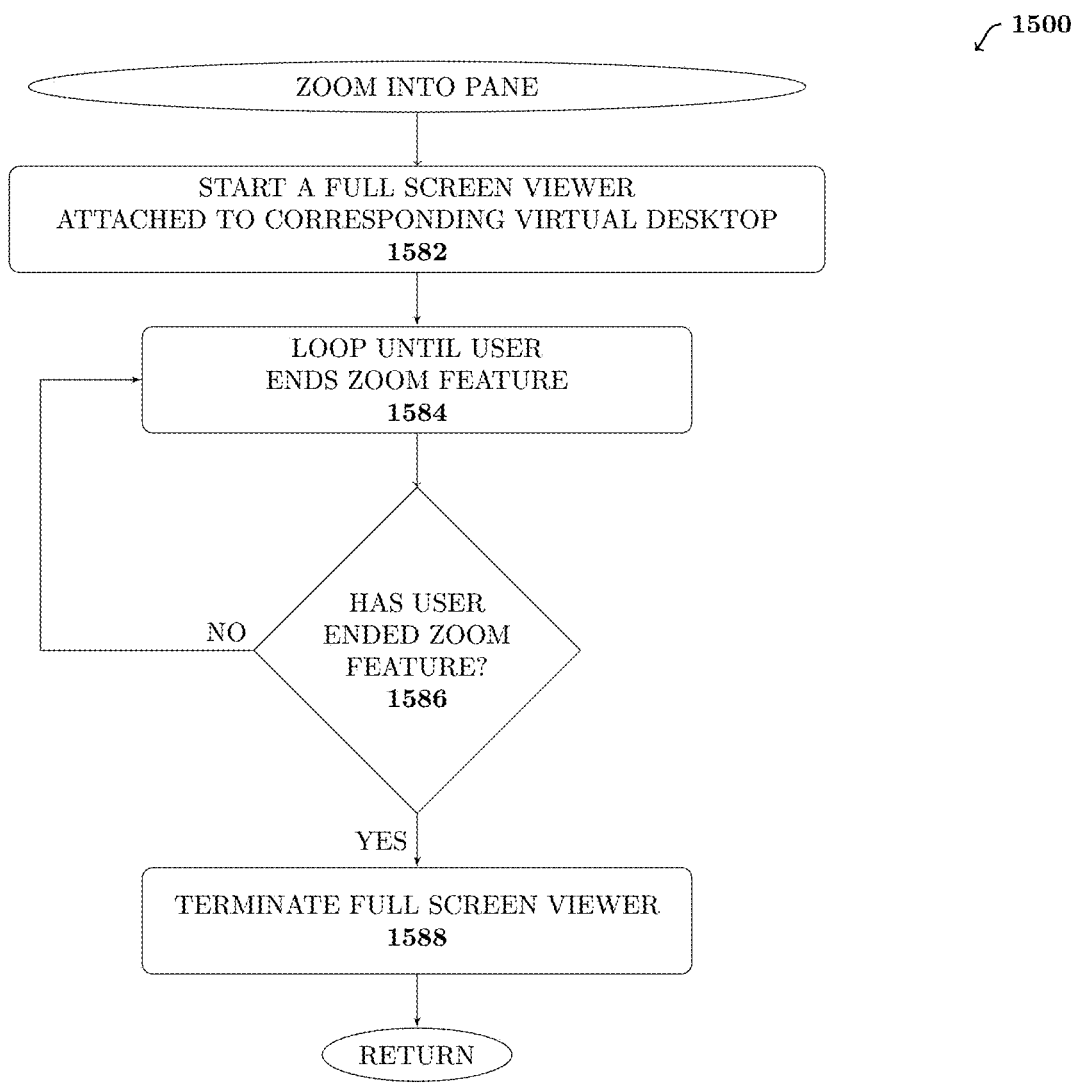
FIG. 15 contains a high-level flow diagram illustrating, by way of example, an algorithm the system may be configured to execute in order to zoom into a particular pane in the grid.

FIG. 15 contains a high-level flow diagram 1500, illustrating, by way of example, an algorithm the system may be configured to execute in order to zoom into a particular pane in the grid, and called as a subroutine from step 1464. A full screen viewer is started (step 1582) which presents the selected virtual desktop to the user and allows interaction. The window manager is configured to prioritize this viewer over everything in the grid, so the grid vanishes from the display so long as the viewer from step 1582 is running. Steps 1584 and 1586 wait until the user ends the zoom feature, typically by either selecting a menu item or by using a keyboard sequence, and step 1588 then terminates the full screen viewer and the grid re-appears.

Remote Desktops.

In preferred embodiments, the system may be configured to present a remote desktop in lieu of a standard virtual desktop. The conventional GUI desktop running on a virtual desktop 320*a* can be replaced with a remote desktop viewer program, configured to connect to a specified remote desktop. The virtual desktop then behaves indistinguishably from a remote desktop, using the same nested viewer-within-server technique used to construct the remote desktop multiplexers.

Figure 16:
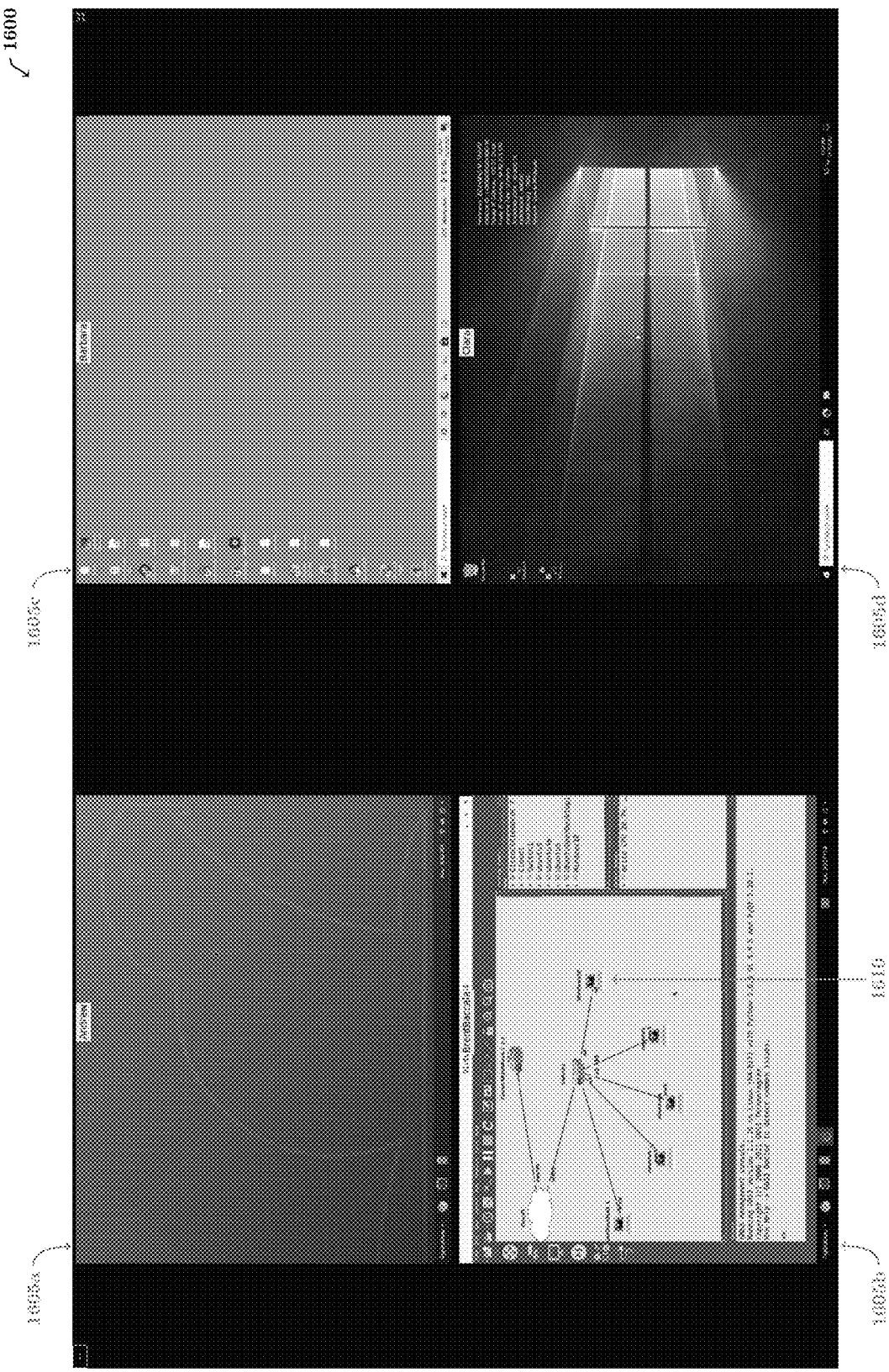
FIG. 16 contains a screenshot illustrating, by way of example, that remote desktops may also be placed in the grid.

FIG. 16 shows a screenshot illustrating how the current embodiment of the invention allows multiple remote desktops to be presented to the users. Screenshot 1600, pane 1605*a* shows a standard GNOME 3 virtual desktop. Pane 1605*b* shows a virtual network visualization program running on another standard GNOME 3 virtual desktop, including icon 1610 indicating a running Windows 10 virtual machine. Pane 1605*c* displays a remote desktop displaying the console of said Windows 10 virtual machine. Pane 1605*d* displays the remote console of a Windows Server instance running in Amazon Web Services, a product of Amazon Web Services, Inc., a subsidiary of Amazon.com, Inc., of Seattle, Wash.

In the current embodiment of the invention, a user's standard virtual desktop can be switched from GNOME 3 to a remote desktop using a two-line xsession file.

Deaf Mode.

In preferred embodiments, the system may be configured to provide a deaf-mode feature, in which the teacher (or moderator) has the ability to disable the audio sharing function for all but one of the participants so that the moderator can then have a private one-on-one conversation with a specific participant in the video conference. More specifically, if the virtual desktop multiplexer of the present invention is integrated with a video conferencing system, then the teacher (or moderator) can have a private conversation with only one of the students (or participants) by selecting and activating the pane in the grid showing a copy of the virtual desktop associated only with that particular student (or participant). When the private one-on-one conversation is completed, the teacher (or moderator) can automatically reconnect the audio for all students (or participants) by navigating back to (or selecting) the entire grid so that all participants can resume transmitting and receiving audio signals, or the teacher (or moderator) can select a different pane in the grid in order to have a private conversation with a different student (or participant).

While the present invention has been disclosed with reference to certain embodiments, numerous modifications, alterations and changes to the disclosed embodiments are possible without departing from the scope of the present invention, as defined in the appended claims. Accordingly, it is intended that the present invention not be limited to the described embodiments, but that it has the full scope defined by the language of the following claims, and equivalents thereof.

What is claimed is:

1. A virtual desktop multiplexing system for a video or audio conference held on a computer network, the virtual desktop multiplexing system comprising:
   (a) a multiplexing server communicatively connected over the computer network to one or more client computers participating in the video or audio conference;
   (b) one or more remote desktop client programs running on said one or more client computers, respectively, each remote desktop client program being configured to establish a remote desktop connection to the multiplexing server over the computer network and cause, for each client computer, respectively, a virtual desktop to start running on the multiplexing server, wherein said virtual desktop is configured to permit a user operating the client computer to execute a user application installed on the multiplexing server;
   (c) a configuration database on the multiplexing server for determining, for each one of said one or more client computers participating in the video or audio conference, whether the user operating said client computer is a privileged user;
   (d) a shared database on the multiplexing server for tracking, for each one of said one or more client computers participating in the video or audio conference, whether said client computer is currently operating in a home mode, a switched mode or a grid mode; and
   (e) a remote desktop multiplexing program running on the multiplexing server, the remote desktop multiplexing program comprising program instructions that, when executed by the multiplexing server, will cause the multiplexing server to transmit to each client computer:
      (i) a home view comprising a view of the client computer's own virtual desktop running on the multiplexing server if the client computer is currently operating in the home mode, or
      (ii) a switched view comprising a view of another client computer's virtual desktop running on the multiplexing server if the client computer is currently operating in the switched mode, or
      (iii) a grid view comprising a view that simultaneously shows a copy of multiple virtual desktops running on the multiplexing server if the client computer is currently being operated by a privileged user in the grid mode.

2. The virtual desktop multiplexing system of claim 1, further comprising a grid view remote desktop multiplexer comprising program instructions that, when executed on the multiplexing server, will cause the multiplexing server to determine a layout for individual panes in the grid in the grid view and automatically assign two or more of the virtual desktops to said individual panes in the grid of the grid view.

3. The virtual desktop multiplexing system of claim 1, further comprising a switched view remote desktop multiplexer comprising program instructions that, when executed on the multiplexing server, will cause the multiplexing server to determine a full screen layout for said view of another client computer's virtual desktop and thereby cause the multiplexing server to transmit said another client computer's virtual desktop to said client computer.

4. The virtual desktop multiplexing system of claim 1, wherein said home view comprises a view of a standard virtual desktop and the user application installed on the multiplexing server is a program with a graphical user interface.

5. The virtual desktop multiplexing system of claim 4, wherein the standard virtual desktop is a GNOME 3 desktop.

6. The virtual desktop multiplexing system of claim 4, wherein the program is a terminal window or a web browser.

7. The virtual desktop multiplexing system of claim 1, wherein said home view comprises a view of a remote desktop viewer program.

8. The virtual desktop multiplexing system of claim 1, wherein said switched view comprises a view of a standard virtual desktop and the user application installed on the multiplexing server is a program with a graphical user interface.

9. The virtual desktop multiplexing system of claim 8, wherein the standard virtual desktop is a GNOME 3 desktop.

10. The virtual desktop multiplexing system of claim 8, wherein the program is a terminal window or a web browser.

11. The virtual desktop multiplexing system of claim 1, wherein said switched view comprises a view of a remote desktop viewer program.

12. The virtual desktop multiplexing system of claim 1, wherein the standard remote desktop protocol is VNC.

13. The virtual desktop multiplexing system of claim 1, wherein the multiplexing program further comprises program instructions that, when executed by the multiplexing server, will cause the multiplexing server to permit the privileged user to select for sharing a particular virtual desktop for any one of said one or more client computers, and thereby cause the multiplexing server to switch one or more client computers from home mode to switched mode and to transmit the particular virtual desktop being shared to some or all client computers operating in the switched mode.

14. The virtual desktop multiplexing system of claim 1, wherein the multiplexing program further comprises program instructions that, when executed by the multiplexing server, will cause the multiplexing server to permit a privileged user to select for use a particular virtual desktop for any one of said one or more client computers, and thereby cause the multiplexing server to determine a full screen layout for a view of said one client computer's virtual desktop, and thereby cause the multiplexing server to transmit said selected virtual desktop to the privileged user's client computer.

\* \* \* \* \*